United States Patent

Hosterman et al.

[15] 3,692,414
[45] Sept. 19, 1972

[54] NON-CONTACTING MEASURING PROBE

[72] Inventors: Harry L. Hosterman, 1146 Meadow Spur; Charles B. Barnett, 1475 Shanabrook Drive, both of Akron, Ohio 44313; Clarence A. Ripley, Jr., 809 Locust Drive, Tallmadge, Ohio 44278

[22] Filed: Feb. 24, 1971

[21] Appl. No.: 118,311

[52] U.S. Cl. .................. 356/167, 356/4, 356/120, 250/236
[51] Int. Cl. ..................... G01b 11/24, G01b 11/30
[58] Field of Search ........... 356/120, 167, 4; 250/236

[56] References Cited

UNITED STATES PATENTS

| 3,016,464 | 1/1962 | Bailey | 356/167 |
|---|---|---|---|
| 3,481,672 | 12/1969 | Zoot | 356/167 |
| 3,506,839 | 4/1970 | Ando et al. | 356/4 |
| 3,520,607 | 7/1970 | Zoot | 356/167 |
| 3,589,815 | 6/1971 | Hosterman | 356/120 |

OTHER PUBLICATIONS

Harrison, "Laser Scanning Surface Profilometer,"

IBM Tech. Discl. Bulletin vol. 13, 3, 8/70, p. 789-80.

Primary Examiner—Ronald L. Wibert
Assistant Examiner—Jeff Rothenberg
Attorney—Oldham & Oldham

[57] ABSTRACT

A non-contacting optical probe capable of giving a continuous reading of the distance from a given reference to a contoured surface. A collimated beam is projected on a first optical axis to the surface to be measured. A second optical axis extends from the surface to be measured at an angle to the first optical axis. When the projected beam meets the surface at the point of intersection of the second optical axis, a reflected beam passes along the second optical axis to a sensor which detects this beam. The projected light beam and its optical axis are caused to reciprocate at an angle to the surface, this being accomplished by passing the collimated beam through a rotating prism. The prism is a regular polygon. A second sensor detects the rotation of the prism. The distance to the surface being measured is detected as the interval of time between the detecting of the prism position by the second sensor and the detecting of the reflected light beam by the first sensor.

6 Claims, 6 Drawing Figures

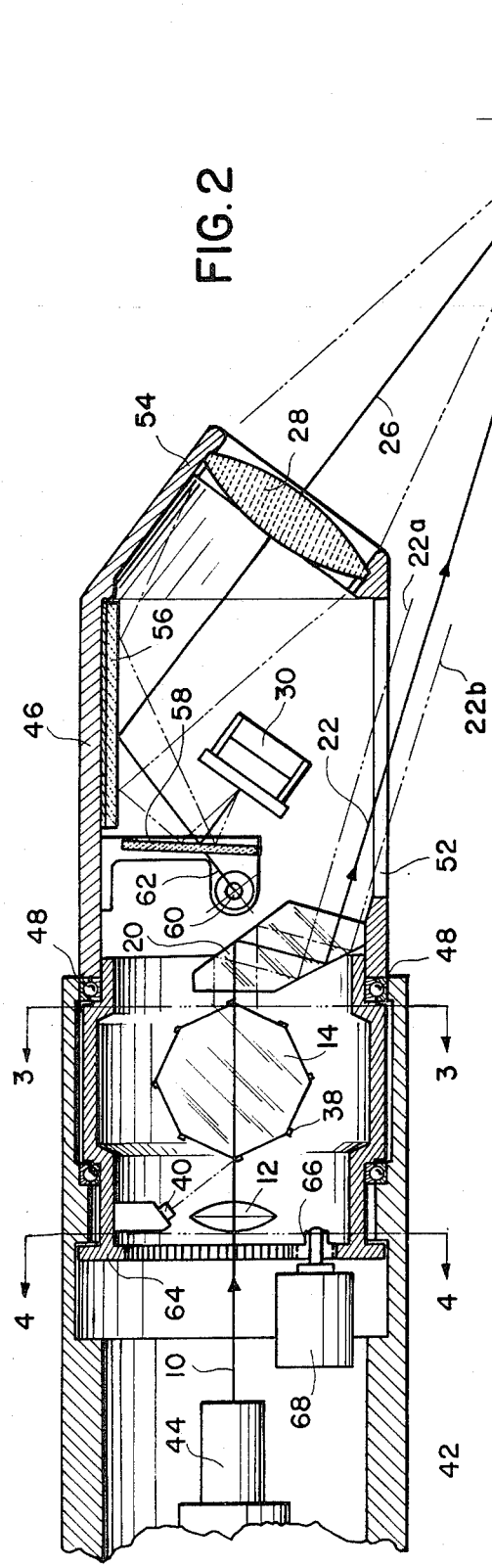
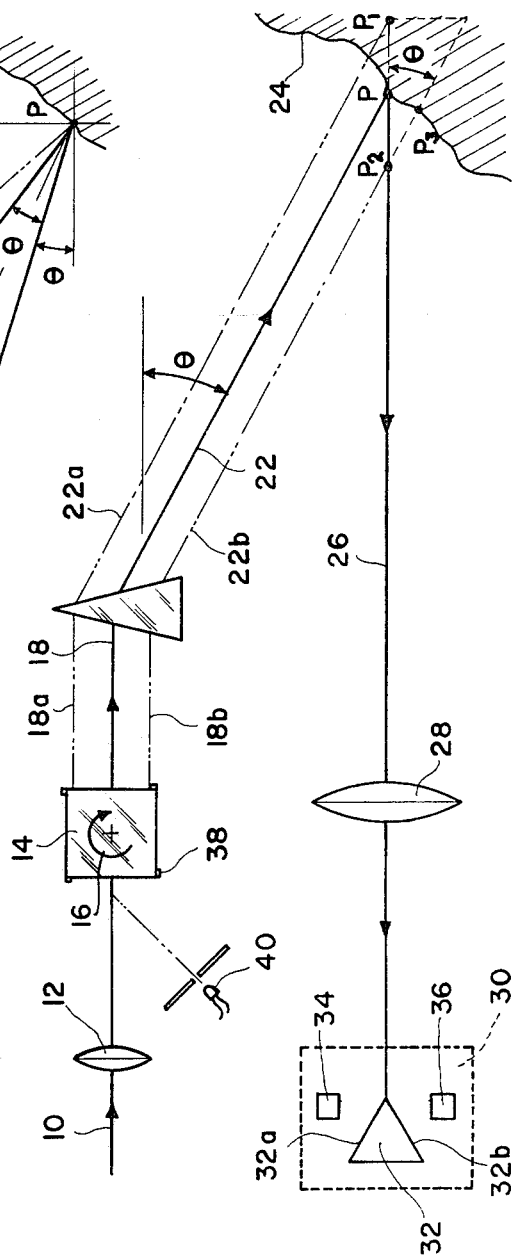
FIG. 2
FIG. 1
INVENTORS
HARRY L. HOSTERMAN
CHARLES B. BARNETT
CLARENCE A. RIPLEY, JR.
BY Oedham & Oedham
ATTORNEYS

INVENTORS
HARRY L. HOSTERMAN
CHARLES B. BARNETT
BY CLARENCE A. RIPLEY, JR

*Oldham & Oldham*
ATTORNEYS

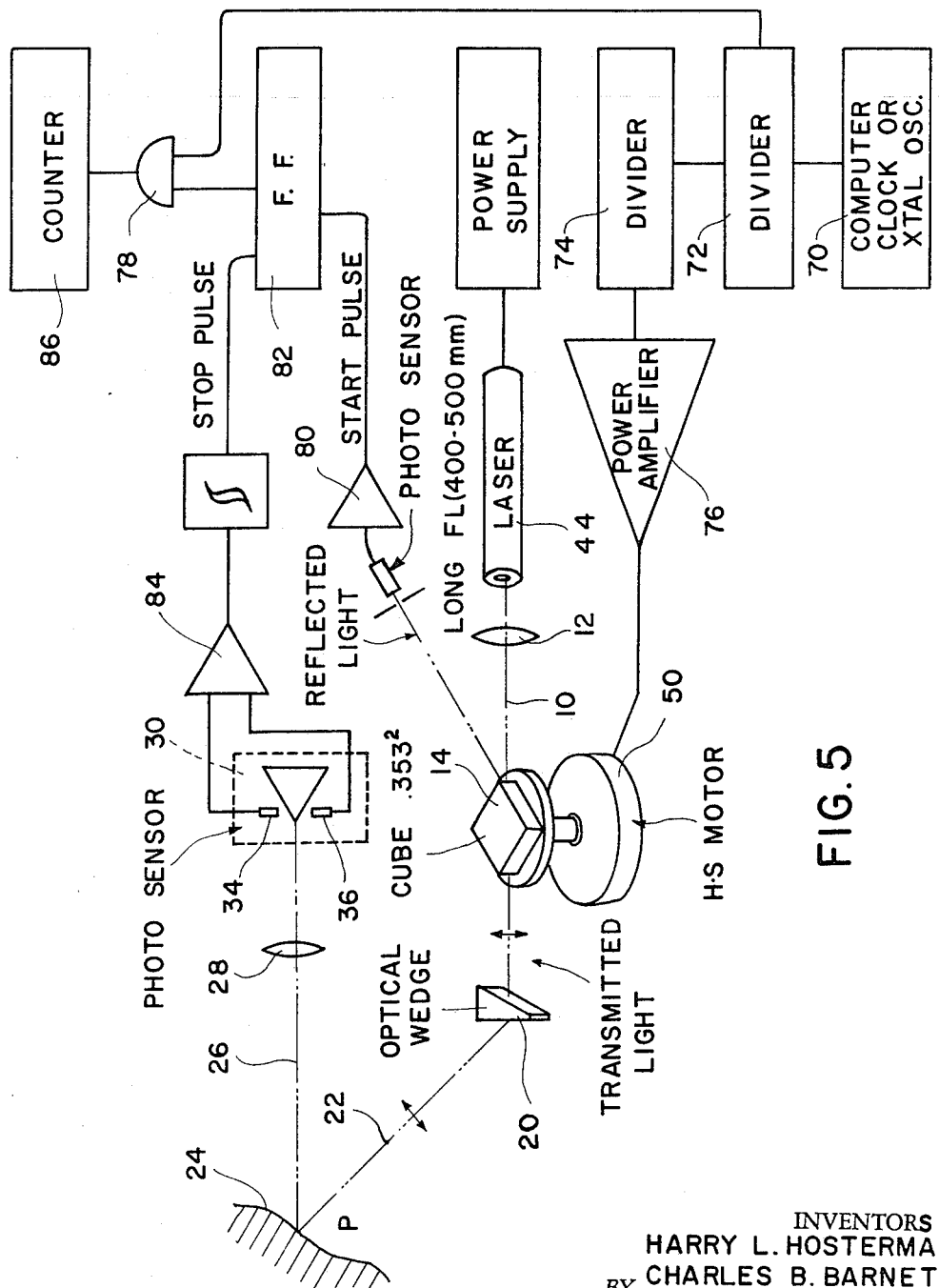

NON-CONTACTING MEASURING PROBE

The prior art has presented various mechanical arrangements for determining the exact dimensions and configurations of a contoured surface. Such dimensions and configurations are used, for example, in the control of numerically controlled machine tools, drafting machines, and inspection machines. Among the arrangements offered by the prior art is the use of mechanical probes which contact the contoured surface to provide the necessary dimensional and configurational information. However, in some instances, the use of a contact probe for making such measurements is undesirable as the probe tends to damage the surface being measured. Also, such mechanical probes are not capable of providing an extremely accurate measurement.

Another arrangement for measuring the surface contour is the use of a non-contacting optical probe. Such an arrangement is shown in Patent application Ser. No. 739,128, filed June 12, 1968, for "NON-CONTACTING MEASURING PROBE," now U.S. Pat. No. 3,589,815 issued June 29, 1971 and assigned to the assignee of the present application. In this arrangement a light beam is projected on a first axis intersecting the surface to be measured. The reflected beam is projected on a second axis to a sensor which detects the point at which the beam is in focus on the surface. The first axis and the projected beam are continuously moved relative to the surface. The surface dimension is determined as the point in the projected beams path of reciprocating movement at which the reflected beam is in focus and centered on its sensor.

In the measuring system of the above-mentioned application, the reciprocation of the projected beam is accomplished by passing the beam through a prism and lens assembly which is oscillated in a uniform manner.

While the non-contacting optical probe arrangement of the above-mentioned application is capable of providing more accurate surface measurement than are the contacting probes, the use of the reciprocating prism and lens assembly generates vibrations within the optical probe and necessitates the provision of dynamic balancers to eliminate these vibrations.

It is the primary object of the present invention to provide a non-contacting probe which is capable of providing highly accurate measurements of a contoured surface and which is relatively simple in construction.

A further object of the invention is the provision of a non-contacting optical probe in which the projected beam scan drive is accomplished without the generation of vibrations, thereby eliminating the need for any dampening arrangements.

It is also an object of the invention to provide a non-contacting optical probe capable of providing a continuous reading of the distance from a given reference to a contoured surface in digital form with a resolution of 0.0001 inch to an accuracy of 0.001 inch and with a reading frequency as high as 240 scans per second.

The above objects and other objects of the invention which will become apparent in the following detailed description are achieved by providing a non-contacting probe to measure contoured surfaces which includes a collimated beam generating means, a rotating prism through which the beam is projected and which is in the form of a regular polygon, means to project the beam from the rotating prism to the contoured surface, means defining a second optical path from the contoured surface at an angle to the path of the projected beam, and sensor means to detect when the projected beam contacts the contoured surface at the point of intersection between the surface and the second optical axis.

For a more complete understanding of the invention and of the objects and advantages thereof, reference should be had to the following detailed description and the accompanying drawings wherein there is shown a preferred embodiment of the invention.

IN THE DRAWINGS

FIG. 1 is a schematic illustration of the preferred embodiment of the invention, showing the relationship of the components to one another;

FIG. 2 is a side elevational view, in section, of the optical probe of the present invention;

Figure 3:
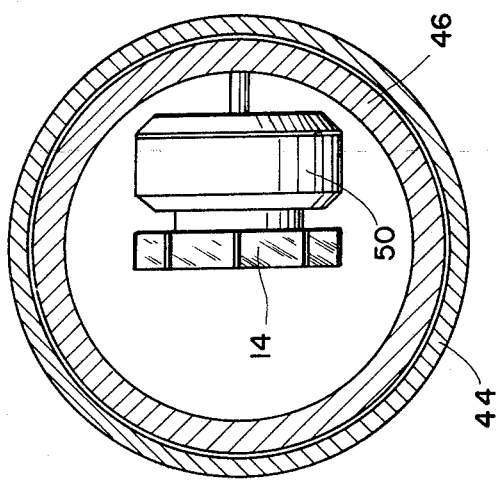
Figure 4:
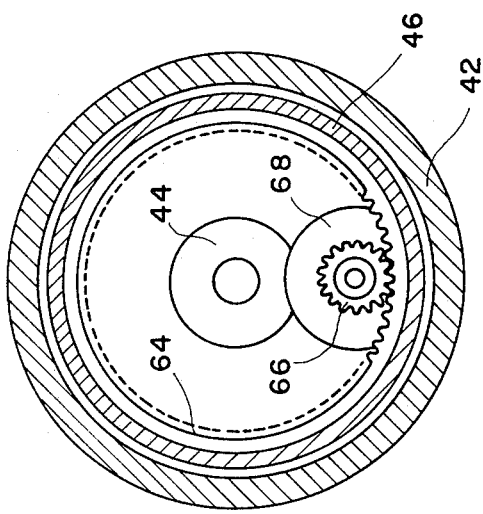
Figure 6:
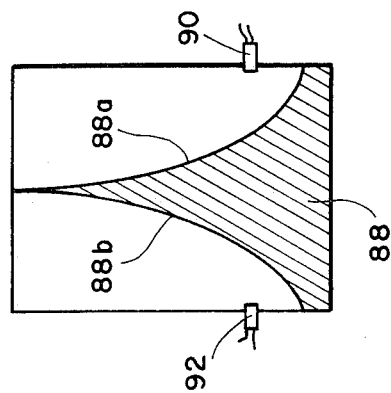

FIGS. 3 and 4 are sectional views taken along the lines 3—3 and 4—4, respectively, of FIG. 2;

FIG. 5 is a schematic illustration of the control and dinension determining circuits of the probe of FIG. 2; and FIG. 6 is a vertical sectional view of one form of detector which may be used with the probe of the present invention.

Referring first to FIG. 1, where the basic arrangement of the non-contacting probe of the present invention is schematically illustrated, the numeral 10 designates generally a laser beam or other collimated radiating wave form in beam configuration. This beam is generated by known means.

The beam 10 is directed through a focusing lens 12 to a prism 14 which is in the form of a regular polygon, a square in this illustration, and which rotates as indicated by the arrow 16. When a prism face is normal to the beam 10, the beam will pass through the prism without deflection along the path 18. As the prism rotates, however, the beam 10 will meet the prism face at an angle other than the perpendicular and will thus be deflected along a path parallel to the path 18 but offset therefrom. The range of the beam is indicated by the broken line paths 18a and 18b. The beam emerging from the scanner prism 14 then passes through a prism 20 which deflects the beam along a path indicated generally at 22 which is inclined at an angle $\theta$ from the beam 10. As the beam is swept by the rotating scanner prism, it will lie between the outer and inner ranges 22a and 22b, remaining parallel to the center line 22. A second optical axis 26, also extending at the angle $\theta$ to the deflected beam axis 22 includes an objective lens 28 and a detector assembly indicated generally by the numeral 30. If a point P on the surface 24 to be scanned coincides with the intersection of the projection axis 22 and the sensor axis 26, the light ray will be reflected from the point P along the axis 26 to the detector assembly 30. As shown schematically in FIG. 1, the detector assembly 30 may include a prism 32 which is a right angled prism with the sides or faces 32a and 32b forming the right angle being brought to an extremely sharp edge. These faces 32a and 32b are reflectively coated, thereby forming a precision beam splitter when the image of the point P falls on the sharp edge of the prism 32. A pair of detectors such as photodiodes 34 and 36 are positioned in 45° relation to the prism faces 32a and 32b, respectively, and when the projected beam 22 strikes the surface 24 at the point P on the axis 26, equal illumination of the sensors 34 and 36 is achieved. If the projected beam 22 strikes the surface 24 at any point other than the intersection of the projected beam 22 with the second optical axis 26 there will not be balanced illumination of the sensors 34 and 36. Thus, when the beam is projected along the path 22b striking the surface at the point $P_3$, an unbalanced condition will be present at the detector assembly.

The intersection of the projected beam 22 and the detector assembly optical axis 26 lies within the range between the points $P_1$ and $P_2$ and there is thus a direct relationship between the point P at which the projected beam strikes the surface 24 at the intersection of the surface of the optical axis 26 and the position of the scanner prism 14 at the instant that uniform illumination of the photosensors 34 and 36 is detected by the assembly 30. In order to provide an indication of the position of the scanner prism 14 reflective bands 38 are provided in each corner of the prism and a photodetector 40 is mounted adjacent the prism to sense the beam of light reflected off of the reflecting strip 38 as this strip is rotated through the beam 10. As will be described in more detail below, suitable circuitry is provided to translate the position of the scanner prism 14 at the instant in which the detector assembly senses a balanced image to provide the dimension of point P relative to a fixed reference.

One embodiment of the non-contacting probe illustrated schematically in FIG. 1 is shown in FIGS. 2, 3, and 4. At this embodiment there is provided a generally cylindrical housing 42 which mounts the beam generating means 44. The housing 42 is supported by a suitable frame (not shown) which includes means to move the probe assembly relative to the contoured surface to bring the probe within its scanning range. A second housing 46, which is also generally cylindrical and axially aligned with the housing 44, is carried at the outer end of the housing 44 on suitable bearings 48. Carried within the second housing 46 are the focusing lens 12 and the scanner prism 14. This embodiment employs an octagonal prism and, as is shown in FIG. 3, the prism is mounted with its center line at right angles to the axis of the beam 10 and centered on the beam. A motor 50 is provided for rotating the prism 14. This motor is preferably a hysterisis synchronous motor, for example, a gyroscope motor manufactured by Gamar Electromatic, Inc. The motor 50 is a frequency sensitive highly stable motor having a high inertia to torque ratio to assure uniform rotation of the scanner prism 14. The second housing 46 also mounts the second prism 20 which is in the form of an irregular hexagon to provide the desired angling of the projection beam 20 relative to the input beam 10 as well as to provide an offsetting of the beam 22 to permit a more compact component layout. Other arrangements such as mirrors may, of course, be employed to direct the projected beam 22 toward the surface 24, if desired. A slot 52 in the second housing 46 is provided for the beam 22. The detector axis 26 extends through the objective lens 28 which is mounted in a suitable housing 54 at the outer end of the housing 46. This lens 28 is preferably a large diameter lens, for example, a 2 inch diameter lens having a 2.2 inch focal length and a 1.1 F number. Mirrors 56 and 58 are provided to fold the detector axis 26 directing it to the detector assembly 30. The provision of the mirrors 56 and 58 again permits a more compact component arrangement. As in the embodiment illustrated in FIG. 1, each of the edges in the prism 14 is provided with an aluminized band 38 and a photodetector 40 is mounted to receive the reflected pulse from this band as it passes through the incoming beam 10.

As the projected beam 22 is swept between its upper and lower limits 22a and 22b, it will create a visual vertical line on the surface 24 being scanned. In order to enable the probe operator to properly position the probe relative to the surface so that the beam 22 is projected within the scanning range of the probe, there is provided an arrangement for projecting a horizontal line onto the surface 24 along the optical axis 26 of the sensor. In order to achieve this horizontal line, the mirror 58 is a dichroic mirror, that is one which reflects the light of one wavelength while transmitting the light of other wavelengths. The mirror 58 is selected so as to reflect light of the wavelength of the laser beam 10. A lamp 60 which projects a slit-like beam is mounted behind the mirror 58 with the axis of its beam 62 being aligned with the extension of the sensor axis 26 between the mirrors 56 and 58. The lamp 60 is preferably an incandescent lamp radiating a broad spectrum of light and all of the light except that at the wavelength reflected by the dichroic mirror 58 will be projected through the mirror 58 and reflected by the mirror 56 along the detector assembly optical axis 26 to form a horizontal line on the object surface 24. When the probe is properly positioned relative to the surface, the horizontal line from the lamp 60 will intersect the vertical line produced by the projected beam 22. This thus provides the operator with a simple visual determination of the correct alignment of the probe assembly. It should be noted that the dichroic mirror 58 has effectively filtered the light of the wavelength of the laser beam 10 from the beam 62 so that, if a portion of the light from the beam 62 is reflected back to the sensor from the surface 24, this light will be passed through the dichroic mirror 58 and will not be reflected to the detector assembly 30.

In order to increase the scanning capacity of the probe, the second housing 46 together with the optics and sensors carried thereby may be rotated about the axis of the incoming laser beam 10 to sweep the scanning point through a circular region of the surface 24. In order to achieve this rotation, an internally toothed ring gear 64 is provided on the inner end of the housing 46 and is driven through a gear 66 or other suitable mechanical coupling by a suitable motor 68. The rotation of the housing 46 may either by in fixed increments or continuous, as desired.

It will be noted that there is a slight defocusing of the projected beam 22 along the detector optical axis 26 as the beam is swept between its upper and lower limits 22a and 22b. However, the laser source 44 provides a collimated lens system, and the lens 12 is provided with a long focal length. These facts, together with the use of the large objective lens 28, minimize the necessity of precise focusing. Further, where the surface 24 is not a perfectly smooth surface, the slight defocusing of the projected beam 22 is desirable since the larger projected spot compensates for any minute localized surface irregularities. In the event that precise focusing of the image is required for high precision measurements, however, the objective lens 28 may be oscillated along the sensor optical path 26 in coordination with the shifting of the projected beam 22 to maintain the focused image at the detector assembly 30 in precise focus.

Referring now to FIG. 5, the control circuit of the probe assembly will now be described. A suitable stable very high frequency source 70 which may be either a computer clock or a crystal oscillator is provided. The output of the frequency source 70 is, preferably, in the range of 1 to 5 megahertz. This output is provided to a first divider 72 which, in turn, provides a first output to a gate 78 and a second output to a second divider 74 which further divides the frequency signal to provide a 60 hertz signal driving the scanning prism motor 50 through an amplifier 76. The gate 78 is controlled by a flip-flop 82 which, in turn, is controlled through an amplifier 80 by the photosensor 40 which detects the passing of a corner of the prism 14 through the laser beam 10. The flip-flop 82 is also controlled through an amplifier 84 from the photosensors 34 and 36 of the detector assembly 30. The operation of the flip-flop 82 is as follows: as an edge of the prism 14 passes through the laser beam 10, the sensor 40 detects this beam to send a pulse to the flip-flop 82. The flip-flop then enables the gate 78 permitting the oscillating signal from the divider 72 to be supplied to the counter 86. When, as the prism 14 rotates, the projected beam 22 strikes the point P on the surface 24 at the intersection of the detector optical axis 26 with the surface 24, a balanced signal is presented by each of the photosensors 34 and 36 of the detector assembly. These balance signals through the amplifier 84 provide a stop pulse to the flip-flop 82 resetting the flip-flop and, through the gate 78, stopping the feed to the counter 86. Since the motor speed and thus the rate of rotation of the prism 14 is controlled from the same frequency source that supplies the counter 86, the count accumulated between the detecting of the edge of the cube 14 and the detecting of a balanced condition in the sensors 34 and 36 is a measurement of the displacement of the point P along the sensor optical axis 26. The stored count in the counter 86 may now be read out by a computer or other equipment utilizing the data of the surface contour. The pulse count may be resolved into orthogonal axes as a function of the angle between the sensor optical axis 26 and the incoming laser beam axis 10. For example, if the optical axis 26 is positioned so as to form a 3, 4, 5 right triangle relative to the laser axis 10, five counts on the optical axis will be resolved into four counts on the X axis and three counts on the Y axis. Where the probe head is revolved about the laser axis 10, an additional resolving factor will be introduced to compensate for this rotation.

It will be understood that changes or additions may be made to the described embodiments without departing from the spirit of the invention. For example, the sensor assembly shown in FIG. 6 may be substituted for the assembly 30 shown in the above-described embodiments. This sensor consists of a pair of congruent paraboloids 88a and 88b forming a knife edge. When the beam reflected from the surface 24 lies on the sensor optical axis 26 equal illumination of each of the phototransistors 90 and 92 will be achieved. Among the phototransistors suitable for such a sensor are Fairchild Phototransistor FPT100 or Optron Phototransistor OP600.

The number of faces of the scanner prism 14 may also be varied, so long as a regular polygon is employed. The depth of scan is related to the dimension between opposite forces of the scanning prism, the scan depth increasing with an increase in the separation of opposite prism sides. The scan frequency is, of course, related to the number of sides of the prism.

While, in accordance with the Patent Statutes, only the best known embodiments of the invention have been described and illustrated in detail, the invention is not so limited and reference should therefore be had to the appended claims in determining the true scope thereof.

What is claimed is:

1. A non-contacting probe for determining the distance from a surface to a predetermined point, comprising:

means for projecting a light beam along a first axis;

an optical prism in the form of a regular polygon, the center of the prism lying on the first axis and the regular side faces thereof being normal to a plane containing the first axis;

means including a frequency responsive motor for rotating the prism to bring successive ones of the faces thereof through the first axis;

first detector means generating an output signal whenever an edge between adjacent faces of the prism passes a preselected point;

means to project the light beam emerging from the prism onto the surface;

means defining a second axis extending from the surface at an angle relative to the projected beam;

second detector means located on the second axis and generating an output signal when the projected light beam is reflected from the surface along the second axis;

means for generating first and second signals directly proportional to one another in frequency, the frequency of each signal being constant, the first signal driving the motor;

a pulse counter; and gate means responsive to the output signals of the first and second detector means to supply the second frequency signal to the counter during the interval between the two output signals.

2. The non-contacting probe according to claim 1 wherein the means to generate comprises a stable oscillator and a divider network receiving the oscillator output signal and generating the first and second output signals therefrom.

3. The non-contacting probe according to claim 1 wherein the means projecting a light beam projects a monochromatic light beam, the means defining the second axis includes a dichroic mirror reflecting light of the wave length of the projected beam, and the probe further includes a light source generating a planar light beam including light of a wave length differing from that of the projected beam, the light source being located so as to project the planar beam through the mirror and along the second axis to strike the surface at right angles to the path of the projected beam.

4. The non-contacting probe according to claim 1 wherein the optical prism is a regular polygon having $2N+2$ sides, when $N = 1, 2, 3, 4, \ldots$.

5. The non-contacting probe according to claim 1 wherein the means to project the shifting light beam includes a second optical prism which directs the light beam emerging from the first prism along a path angled relative to the first axis.

6. The non-contacting probe according to claim 1 wherein each face of the prism is provided with a reflective band along one edge thereof and the first detector means includes a photosensor mounted so as to receive the light beam reflected by the band as the prism edge passes through the light beam from the light source.

* * * * *